United States Patent [19]
Durbin et al.

[11] Patent Number: 4,933,842
[45] Date of Patent: Jun. 12, 1990

[54] AUTOMATED INVESTMENT FUND ACCOUNTING SYSTEM

[75] Inventors: Gary L. Durbin, Oakland; Martha C. Johnson, Foster City; Scott A. Willey, Sunnyvale; Michael J. Hemmert, San Francisco; Karen V. Beaman, Oakland, all of Calif.

[73] Assignee: Tesseract Corporation, San Francisco, Calif.

[21] Appl. No.: 162,399

[22] Filed: Feb. 29, 1988

[51] Int. Cl.⁵ .............................................. G06F 15/30
[52] U.S. Cl. ..................................... 364/408; 364/406
[58] Field of Search .............................. 364/406, 408

[56] References Cited

U.S. PATENT DOCUMENTS

| | | | |
|---|---|---|---|
| 4,648,037 | 3/1987 | Valentino | 364/408 |
| 4,674,044 | 6/1987 | Kalmus et al. | 364/408 |
| 4,694,397 | 9/1987 | Grant et al. | 364/406 X |
| 4,750,121 | 6/1988 | Halley et al. | 364/408 |
| 4,751,640 | 6/1988 | Lucas et al. | 364/408 |
| 4,774,663 | 9/1988 | Musmanno et al. | 364/408 |

*Primary Examiner*—Jerry Smith
*Assistant Examiner*—Steven G. Kirby
*Attorney, Agent, or Firm*—Townsend & Townsend

[57] ABSTRACT

A computerized investment plan accounting system manages data for investment plans with multiple participants and multiple investment funds. When a transaction is entered, one side of the transaction (either units or dollars) may be flagged as pended. When the unit value for the fund is determined and stored, the pended side is calculated, stored, dated, and flagged as fixed. Investment fund balances are accumulated by posting the transactions to investment fund accounts. Individual participant fund balances are determined by accumulating transaction data in a multi-dimensional matrix. The participant fund balances are combined for all participants, and the combined totals are compared to the investment fund balances.

13 Claims, 5 Drawing Sheets

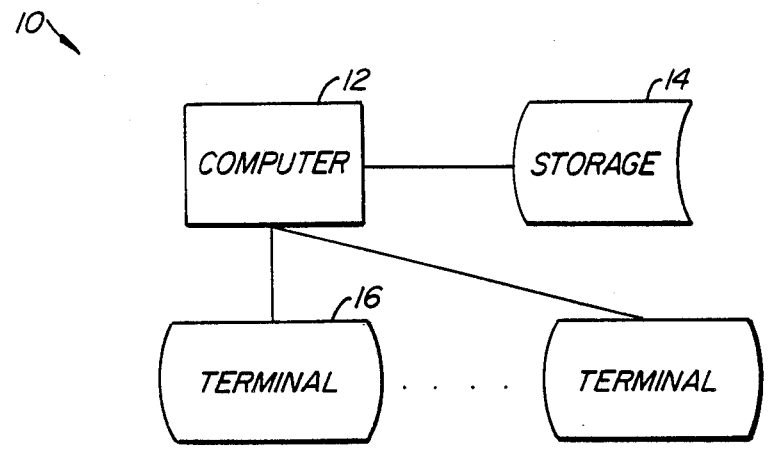
FIG._1.
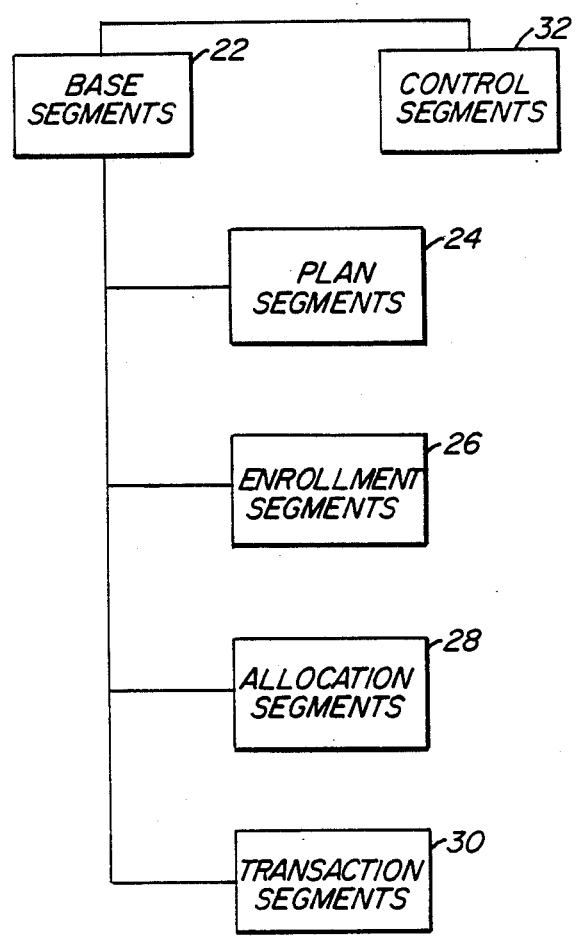
FIG._2.

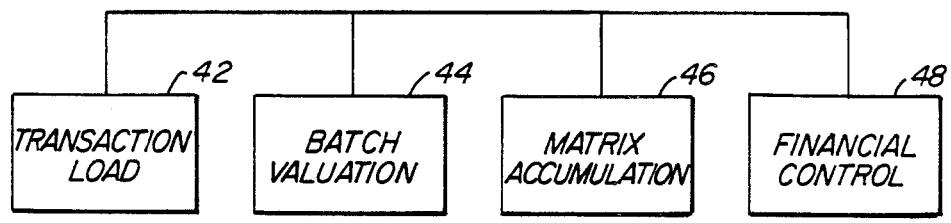
FIG._3.
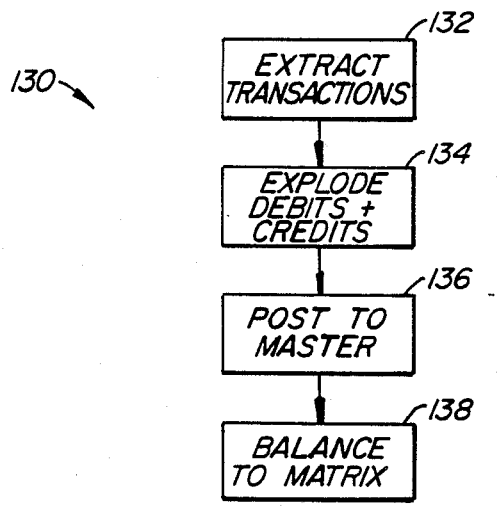
FIG._6.
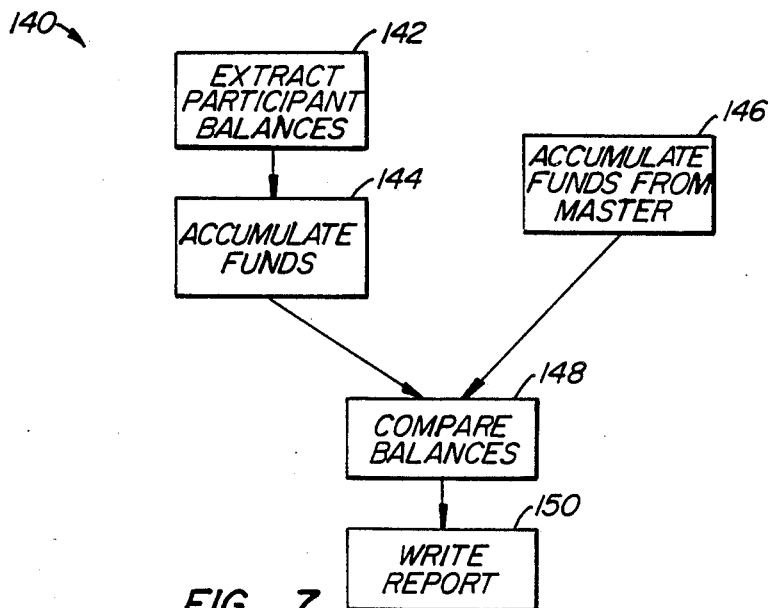
FIG._7.

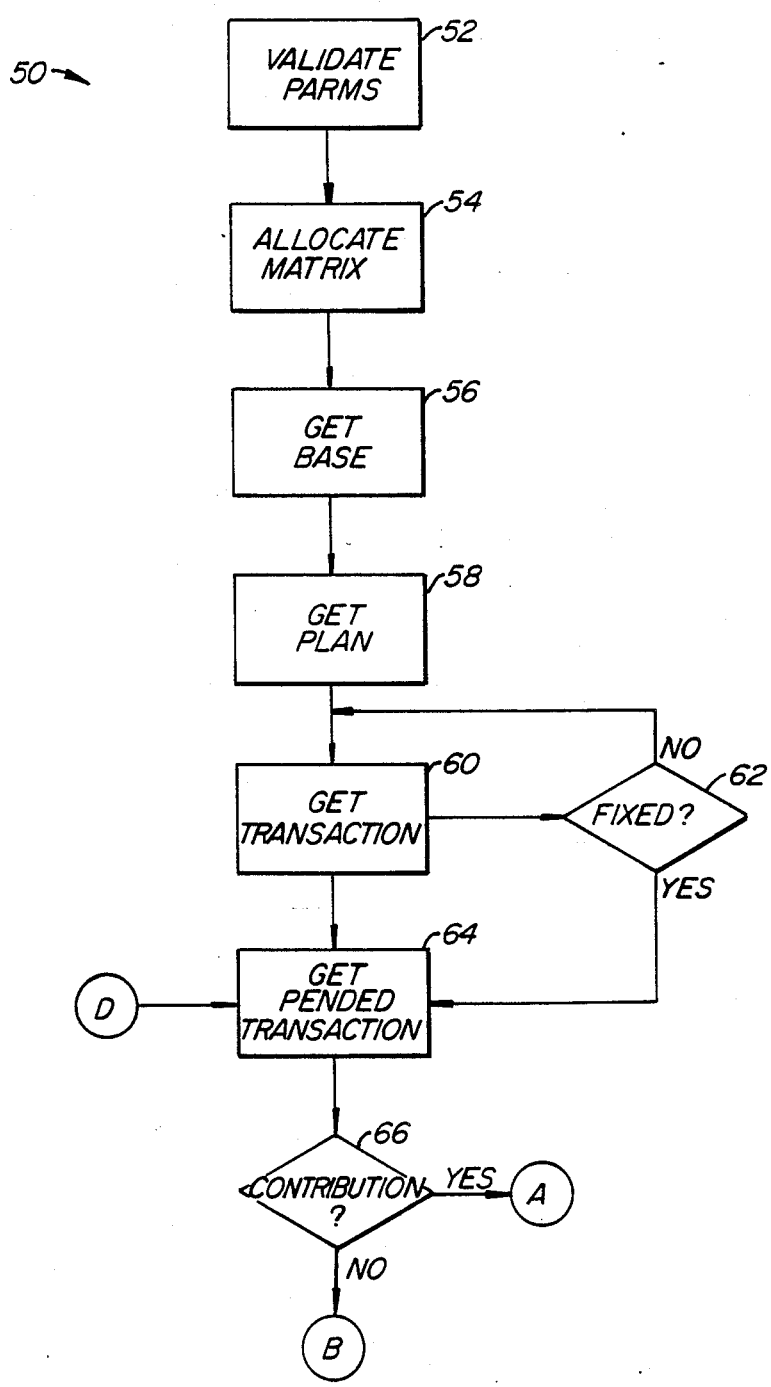
FIG._4a.

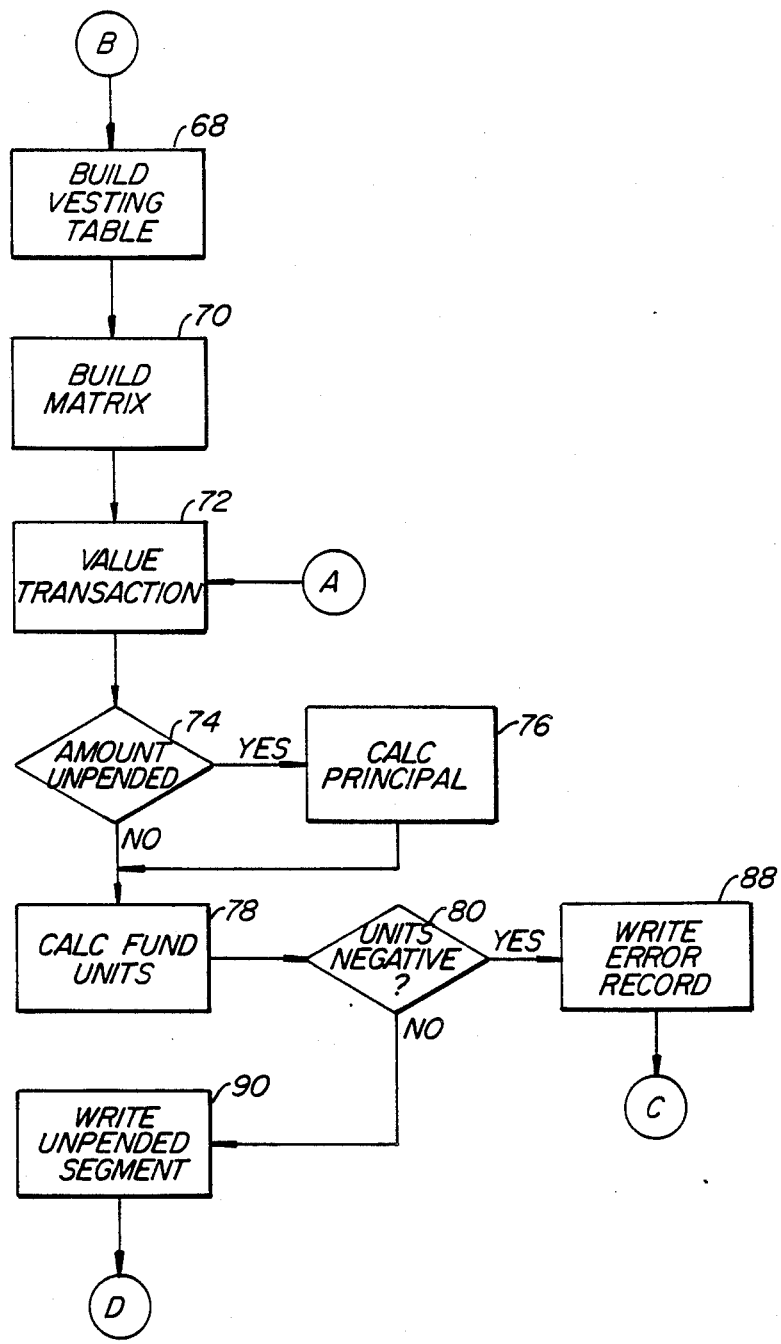
FIG._4b.

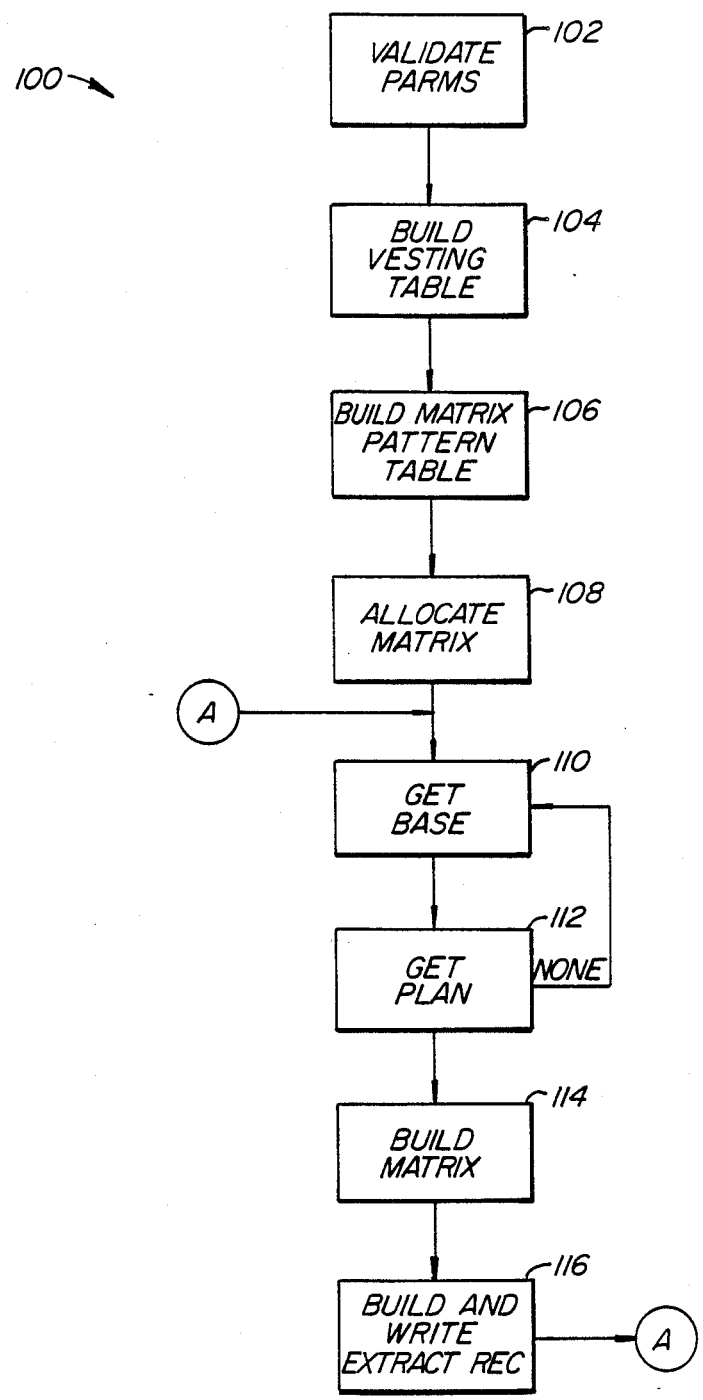
FIG._5.

AUTOMATED INVESTMENT FUND ACCOUNTING SYSTEM

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

This invention relates generally to computerized data processing systems, and, more specifically, to a computerized system for processing data for investment plans with multiple funds and multiple participants.

Many companies offer their employees the benefit of participation in one or more investment plans. These plans usually include various types of investment funds such as IRAs (Individual Retirement Accounts), 401(k) plans (investment plans with special tax advantages), and the like. Each fund type can include several investment funds (e.g., GIC, equity, stock) among which investments can be allocated. Employees can enroll in an investment plan and make contributions, transfers, and withdrawals of money at different times in various funds.

Although computerized systems exist for processing the data related to such investment plans, the management of the plans presents many problems which have not been overcome without either excessive manual intervention or undesirable constraints on investments. For example, the unit value of a fund (total money in the fund divided by number of outstanding shares) varies over time and may not be known at the time a contribution or other transaction is made. In most prior art systems, this means that transactions cannot be entered into the system until the unit value is known. Similarly, the amount of a participant's vested monies and earnings in a particular fund will generally vary over time, making it difficult to determine such amounts and to process some types of transactions at any particular time. In general, with money flowing in and out of multiple funds over time, and valuations changing frequently, it becomes difficult to maintain and retrieve accurate data and to balance the system.

SUMMARY OF THE INVENTION

According to the invention, each investment plan transaction is represented by two transaction amounts: a dollar amount and a unit amount. These transaction amounts have a mathematical relationship to each other which varies over time and which may be undetermined when a transaction is entered into the system. A first transaction amount (units or dollars) is stored, dated and flagged as fixed. A second transaction amount is flagged as pended. At a later time, the relationship between the first and second transaction amounts is determined and stored. Then the second transaction amount is calculated, stored, dated, and flagged as fixed.

Individual participant fund balances are determined by reading the transaction data and accumulating, in a multi-dimensional matrix (array), separate balances for each investment fund type, fund, time class (vested or unvested), transaction type (contribution, withdrawal, transfer, forfeiture) and money class (principal or earnings). These separate balances may then be summed along one or more dimensions of the array to provide combined or net balances.

Investment fund balances are accumulated by reading the transaction data, generating debit and credit transactions, and posting these transactions to investment fund accounts. If the second transaction amount is flagged as pended, then the first transaction amount is posted to a holding account. When the second transaction amount is fixed, both amounts are posted to an investment fund account.

The system is controlled and balanced by comparing the accumulated investment fund balances in the investment fund accounts to an accumulation of the transaction data. Individual participant balances are calculated using the matrix accumulation process, these balances are combined for all participants, and the combined totals are compared to the investment fund balances.

The invention provides an improved system for managing data for investment plans with multiple participants and multiple investment funds, where the conversion factor between dollars and units for one or more funds may be undetermined for variable periods of time. Advantageously, the system allows for the presence of time-variant values in the data base while maintaining complete accounting controls.

BRIEF DESCRIPTION OF THE DRAWINGS

FIG. 1 is a block diagram of a computer system for implementing the preferred embodiment of the invention.

FIG. 2 is a block diagram of the principal types of data segments used in the data base in this embodiment.

FIG. 3 is a block diagram of the major processes of the preferred embodiment.

FIGS. 4a-4b flow charts of the Batch Valuation Process.

FIG. 5 is a flow chart of the Matrix Accumulation Process.

FIG. 6 is a flow chart of the Financial Control Process.

FIG. 7 is a flow chart of the Financial Control Balancing Process.

DETAILED DESCRIPTION OF THE PREFERRED EMBODIMENTS

FIG. 1 is a block diagram of a computer system 10 for implementing the preferred embodiment of the invention. Computer 12 is a general purpose digital computer, which in this embodiment is an IBM 3081 mainframe computer. External storage sub-system 14 is coupled to computer 12 for storing data and programs on direct access devices such as magnetic disks and sequential access devices such as magnetic tapes. Users and operators can enter and access the data and programs through terminals 16 coupled to computer 12. These terminals may be personal computers, IBM 3270-type intelligent terminals or the like.

Referring to FIG. 2, the principal types of data segments used in the data base in this embodiment are shown. The Investment Plan Management (IPM) system embodying the present invention is integrated with a larger Human Resources Management System; only those segments relevant to the IPM subsystem will be shown and described. Detailed segment definitions are provided in Appendix 1. Employee/participant base information segments 22 (Segment types AA, A1) store data which is uniquely associated with each employee, such as name, address, work location, etc. The base segments also include logical pointers to the other segments for the employee. Plan segments (BB) 24 store information about the plans in which a participant is enrolled. Plan segments have an effective date, plan code, and status code, from which it can be determined if a participant is active in a particular plan as of a particular date. Enrollment segments (C7) 26 store information about a participant's fund type elections and payroll contributions to the elected fund types for various time periods. Allocation segments (C8) 28 store information about the participant's allocation of money among the funds in the fund types. Enrollments and allocations indicate the elections made by a participant from the available options. The transaction segments (C9) 30 store information about the flow of money, such as contributions, withdrawals, and transfers.

Control segments 32 store definitional data, for example, the meanings of various codes stored on other types of segments. These control segments provide a means for storing data which is applicable to more than one employee/participant. Most of the control segments are stored in date-sensitive tables which contain a plurality of "output elements" as a function of an effective date and one or more "table keys". In this embodiment, date-sensitive tables are implemented by storing an effective date as part of the key. The definitions of the tables referred to in this description are provided in Appendix 2. Other control segments include the benefit control segments, which contain data characteristic of particular plans.

In the preferred embodiment, most of the segments, including the control segments, can be viewed and updated on-line, through a variety of screen displays on the terminals. It will be understood, however, that the invention can be practiced in what is known as a "batch processing" environment, or any combination of batch and on-line systems. Similarly, the particular organization of data into data segments, and the physical organization of segments in the data base, may be varied to comport with a particular data processing environment. It is one of the advantages of the invention that it may be practiced with either a simple, single-key direct-access file management system, such as IBM's VSAMV (Virtual Storage Access Method), or with complex data base management systems (DBMSs) such as IDMS (from Cullinet Corporation), ADABAS (from Software AG) or IMS (from IBM).

Referring to FIG. 3, the major processes of the preferred embodiment are shown in a block diagram. (It is assumed that a participant has enrolled in an investment plan and has elected fund type(s) and fund allocations.) Transaction load 42 loads C9 transaction segments to the data base when the data is available, even if fund valuations are not current. If reliable unit values are not available, transactions may be partially "pended". Batch valuation process 44 periodically assigns reliable values to pended transaction segments using unit values that have been updated since the transactions were entered. Matrix Accumulation Process 46 extracts data from the data base in a form requested by the user. Financial control process 48 updates a fund balance file and also balances accumulated individual fund balances with the fund balance file accounts. Each of these processes will be described in greater detail below.

Each of the programs described herein consist of several modules, some of which are written in ANSI COBOL and others are written in IBM OS/360 Assembler Language. Although the description that follows will be understood by those skilled in the art, the source code for the critical modules is supplied at the end of this specification. Therefore, module names will be used in the description to aid in referencing the appropriate modules.

TRANSACTION LOAD

Transactions in the form of contributions, withdrawals, transfers, and forfeitures are initiated at various times. A transaction affects one or more investment funds, according to rules in effect as of the effective date of the transaction. These rules may vary over time and may in fact be unknown at the time the transaction is made. For example, a contribution of $1000 will purchase a particular number of units (shares) in a fund, but the value of a unit is unknown until the total fund value (as of the transaction's effective date) is known. Similarly, the amount of money withdrawn by a withdrawal of 100 units depends on the unit value of the fund. Further, a withdrawal of vested monies requires a determination of how much of the money in a fund is vested, which depends on such time-variant factors as: how long the money has been in the fund, how long the participant has been in the plan, and/or how long the participant has been employed by the employer. The vesting rules themselves may vary over time. Still further, some transactions may be retroactive, governed by rules in effect at an earlier time.

Because of the time-variant effects of these and other transactions, it has been found preferable to store data representing the effects of the transaction on the fund(s) involved, rather than to store the cumulative results (i.e., the participant's fund balances in terms of earnings, principal, vested and unvested money) of the transactions. The C9 transaction segment (App.1) includes fields for an effective date, a transaction code, and multiple occurrences of Fund Type/Fund data. Each Fund Type/Fund occurrence can store an amount in dollars (fund amount) and an amount in units (fund units). These amount fields store the effect of the individual transaction, in its most discrete form, e.g., a $1000 contribution, a 100 unit withdrawal. This is to be distinguished from the common practice of storing the participant's cumulative balance in each fund after the transaction, which is rendered unnecessary by the invention. (Although a balance forward amount is calculated and stored in this embodiment, it is used as a data base control only.) By storing only the time-variant effects of a transaction, the most common transactions (contributions) can be processed more efficiently. Moreover, all transactions are completely and automatically reversible, a capability commonly impossible in prior art systems.

Each transaction segment also contains an "amount status" field and a "unit status" field. The transaction code, after translation through table 528, determines whether the transaction is a contribution, withdrawal, transfer, or forfeiture, and whether the transaction data is entered in units or dollars. If the transaction data is entered in dollars, then the dollar amount is stored in the fund amount field(s), and the "amount status" field is set to "F" (fixed). The Fund type/fund is then used to access table 531, the valuation rules table. This table provides unit values for the fund for one or more time periods bounded by an effective date and a reliability-through date. If there is a reliable unit value in table 531 for the time period encompassing the effective date of the transaction, then the number of units is determined (dollar amount divided by unit value), stored in the unit amount field, and flagged as fixed (in the unit status field). If there is no reliable unit value for any of the affected funds as of the transaction's effective date, the unreliable number of units is calculated and stored, but a flag of "P" (pended) is stored in the unit status field. Conversely, if the transaction data is entered in units, and there is no reliable unit value in table 531, then the "unit status" field is set to "F" and the "amount status" field is set to "P". In this manner, transactions are stored in the data base as they are entered, with the two status flags indicating whether the dollar amounts and the units are fixed (reliable) or pended (unreliable). Two date fields (Valuation Amount Date, Valuation Unit Date) store the dates on which the dollar and unit amounts become fixed.

The transaction load process can be performed by on-line or batch processes. In the preferred embodiment, both types of processes are used to load transactions. Regardless of the method or time of creation, transaction segments are logically sequenced by effective date within participant number. Segments with duplicate effective dates are logically sequenced by creation date within effective date. To control sequencing, a sequence number is assigned to each transaction segment and stored in the low-order part of the record key field. Thus, regardless of the actual physical organization of segments, it is always possible to access the "next" or "previous" transaction segment by incrementing or decrementing the sequence number (or, in some environments, using a "get next" or "get previous" access request).

BATCH VALUATION

Periodically, as new fund values are known, new unit values are determined and entered by the user in Table 531. The Batch Valuation process takes the unit value entered on Table 531, calculates and stores fixed values for previously-pended unit or dollar amounts on the transaction (C9) segment, and recalculates account balances based on this new reliable unit value. The date of valuation is stored in the appropriate valuation date field. This process generates reports of valid and invalid transactions, total amounts and units calculated by Fund Type and fund, and control counts.

After the user updates table 531 (Output 3) with a reliable unit value and reliability through-date (Output 10), the Batch Valuation process is executed. The user supplies parameters (parms) including a plan code and an end date. Transactions with effective dates less than the end date will be unpended, if reliable unit values are found in the table. Balance forward amounts will be recalculated from the most current fixed transaction on the participant's transaction records through the end date.

Referring to FIGS. 4a-4b, a flow chart 50 illustrates the method of the batch valuation process of this embodiment.

The mainline module, PMPIB10, is entered first and it controls the overall processing, calling other modules to perform specific functions. At block 52, the parameters on the parm card are read in and validated. At block 54, a matrix is allocated by calling module PMPMXALC. That module determines the maximum number of fund types, funds, and transaction classes (for the plan specified on the parm card), puts these numbers in the dimension table, and builds translation tables for all three fields. The matrix, when data is filled into it, will contain values for each Fund type/fund, by transaction class (contributions, withdrawals, etc.) and time class (vested/unvested), as of the specified date. For each combination of fund type, fund, transaction class, and time class, the matrix will contain values for principal, earnings, amount and units. As will be seen, this projection of transaction records into a five-dimensional matrix is used in several processes in this embodiment, because it explicitly provides what the transaction records provide implicitly: a steady-state representation of the cumulative effects of all of a participant's transactions.

At block 56, the participant processing loop begins by accessing a participant's "base" segment(s). These segments contain basic data on the participant and logical pointers to the participant's other data base segments.

At block 58, the participant's current plan segment for the plan specified (in the parm card) is accessed to determine whether the participant is active in this plan as of the supplied end date. If not, the next participant segment is read.

At block 60, a transaction segment is read for this participant. Transaction segments are read in reverse logical sequence, highest effective date first. (As noted above, transactions are logically sequenced by effective date; segments with equal effective date are sequenced by date of creation.) Transaction segments for other plans are ignored. At block 62, each transaction segment for the specified plan is checked to determine whether the segment is unpended. For this purpose, a segment is unpended if it has an "F" in the Amount-status and Unit-status fields, and a "Y" in the reliability-flag field. (A reliability-flag of "N" indicates that there are pended segments with an effective date less than or equal to the effective date of this transaction segment.) When an unpended segment is found, it is known that there are no pended transactions for this plan with earlier effective dates. The transaction segments are now read again in forward logical sequence for the purpose of unpending those segments, starting with the next segment for this plan.

At block 64, the first (earliest effective date) pended segment is then processed. Its effective date is checked to make sure it is less than the parm end date. Table 528 is read to determine the transaction amount type and vesting pattern for the transaction code in this segment (as of the segment's effective date). If it is determined at block 66 that this transaction is a withdrawal, transfer, or forfeiture (not a contribution), then two internal tables are built. These tables will be used to validate the transaction (e.g., to make sure that unpending the transaction will not result in a negative balance in a fund). One is a vesting table (block 68), indicating the vesting rules for this transaction. The other is the matrix described above, which is built (block 70) by calling module PMPMXBLD. The operation of PMPMXBLD will be described briefly at this point, and in more detail below as part of the matrix accumulation process.

Module PMPMXBLD (and the modules called by it) builds the matrix for this participant for this plan by reading the transaction segments in forward effective date sequence, and applying their effects to the appropriate matrix cell(s), until it reaches the segment which has been identified as the last unpended segment. The matrix then contains the cumulative effect of transactions by fund, fund type, transaction class, time class, and money class (principal, earnings, units, and amounts).

Control then returns to PMPIB10, where, at block 72, the module PMPIUMVL is called to value the transaction as of its effective date by using the unit value in table 53!. This process should unpend the transaction and store the date of valuation in the appropriate date field (Valuation Amount Date or Valuation Units Date). If the transaction cannot be valued (no reliable unit value), the record is written to the error file. If the transaction is successfully unpended, then a test is made at block 74 to determine whether it was the dollar amount which was pended and is now fixed; if true, then, at block 76 the principal amount is calculated for the unpended transaction and stored in the transaction record. Then, at block 78, module PMPMXSTR is called to calculate the number of units in each fund.

Module PMPMXSTR is a general module for retrieving data from the matrix; its operation will be described in more detail below as part of the matrix accumulation process. It is called here to calculate the account balance, in units, for this participant, for each fund type/fund in this transaction segment, for all transaction classes and all vesting categories. The result is added to the units field for the fund type/fund in the newly unpended transaction segment to determine the balance, in units, after the transaction. At block 86, each new balance is verified to make sure that it is not negative. If any fund balance is negative, the segment is written to the invalid file for corrective action, and no further transactions are processed for this participant. Otherwise, at block 88, report data is written to a file for other programs to use for reporting.

At block 90, the newly unpended transaction record is written to the data base. Before the record is written, the reliability flag is updated to "Y", and the transaction amount field is updated to indicate the total transaction amount for the transaction. The balance forward field is then updated by adding the total transaction amount to the balance forward for the prior segment. The transaction segment is written to the data base and the program branches to block 64 to get the next transaction segment for this participant. In the next iteration, the matrix-building program will include all unpended transactions, including the new one which was just unpended.

When a transaction record is read which has an effective date greater than the parm date, or there are no more transaction records for this participant/plan, the process goes to block 56 to read the next participant base record. This loop continues until all participant base segments have been read and all transaction segments have been processed.

MATRIX ACCUMULATION PROCESS

The matrix accumulation process enables users to create an extract file which can be used to obtain information about fund amounts and participant account balances in the investment plan.

Individual enrollment, allocation, and transaction information is stored in separate segments in the data base. The matrix accumulation process retrieves these individual segments and summarizes account balances for the participant, in the form requested by the user.

Before executing this process, the user defines a Matrix Accumulation Result Pattern on Table 569. Each result pattern determines up to 48 "composition strings". A composition string specifies a matrix sum to be calculated and output to the extract file. A composition string is specified in the form:

$$TFCVM \pm TFCVM \pm \ldots TFCVM$$

where
T = Fund Type
F = Fund
C = Transaction Class (contribution, transfer, etc.)
V = Time Class (vested or unvested)
M = Money Class (principal, earnings, units, amount).

For example, the string "ABCNP + ABWNP" would cause the program to calculate and output the sum of two numbers: (1) Fund type "A", Fund "B", Transaction Class "C" and unvested (new) principal "NP" plus (2) Fund Type "A", Fund "B", Transaction Class "W", and unvested (new) principal "NP". The figure calculated in this example would represent the sum of contributions and withdrawals of new principal in Fund Type/fund "AB" for each participant. A wildcard ($) may be used in any of the first four positions (T,F,C,V) to indicate that all values should be summed for that dimension. If $ is specified for transaction class, the system will generate a net balance for all transactions.

The 48 possible sumstrings in table 569 correspond to 48 fields in the extract output records.

Up to 12 separate records can be generated for each Result Pattern, using different record labels. The user also specifies parameters (parms) to this program, including vesting pattern, plan, target date (end date), start date, and an indicator of whether pended transactions are to be included.

Referring to FIG. 5, a flowchart 100 illustrates the matrix accumulation process, as executed by batch program PMPMX000. The mainline control module, PMPMX00, is entered first and controls the calling of other specialized modules.

At block 102, the parms are read, validated and stored. The program PMPMXSET is then called to set up the vesting table and the matrix. This module calls module PMPMXBVT, which, at block 104, builds the internal vesting table, using the vesting pattern passed as a parm. At block 106, module PMPMXSET builds the internal matrix pattern table, based on table 569. The internal matrix pattern table contains all of the composition strings for the specified Matrix Accumulation Record Pattern (primary key to table 569).

At block 108, module PMPMXSET calls module PMPMXA's to allocate the matrix. Module PMPMXALC determines the maximum number of funds, fund types and transaction classes for the parm-specified plan, using tables 544 and 571, and puts these numbers into the dimension table. It also builds translation tables for these three fields.

At block 110, the participant loop begins. Each potential participant's base information segment is read, and at block 112 the participant's plan segments are also read. If the participant is enrolled in the parm-specified plan, as of the target date, then at block 114 PMPMXBLD is called to build the matrix for this participant plan. Transaction (C9) segments are read for this participant and the plan code and effective date are used to select relevant segments. Only those with effective dates between the start date and the target date are used to build the matrix.

The matrix is a 5 dimensional array, indexed by fund type, fund, transaction class, time class, and money class (principal, earnings, amount, units). The full matrix is built, and the requested summaries are derived from it. If requested, pended transactions may be included in the matrix.

Module PMPMXBLD calls a different module for each major type of transaction: PMPMXCON for contributions, PMPMXTRN for transfers, PMPMXFOR for forfeitures, or PMPMXWDR for withdrawals. Each of these modules calls module PMPMXFND to read or write vales in the Matrix cells. These modules, which include detailed narratives of their operation, are supplied in Appendix 3. Only their general function will be described here.

If the transaction is a contribution, the vesting rules table 525 is examined to determine if there is some portion of the contribution that is not yet vested (available for withdrawal). The contribution is then split into the vested and unvested portions and summed directly into the cells in the matrix.

If the transaction is a transfer, a fund type is selected from the record. The source funds are accumulated to determine how much of the transfer involved vested and unvested funds. The transferred funds are applied to the target funds such that each target fund receives a proportionate amount of vested and unvested transfer monies.

If the transaction is a withdrawal, the withdrawal amounts are subtracted from vested monies for the appropriate fund types and funds in the matrix.

If the transaction is a forfeiture, the forfeiture amount is subtracted from unvested monies for the appropriate fund types and funds in the matrix.

After all transactions are processed in this manner, earnings are calculated by calling module PMPMXERN. (Earnings are not explicitly stored in the transaction segment) This module loops through the whole matrix. For every possible fund type and fund, (A–Z, 0–9), the matrix entry for every possible transaction class and every possible time class are read. If there is a non-zero entry for units, table 531 is read to get the unit value. Then, for each Fund type/fund/transaction class/time class combination, earnings (as of the target date) are calculated as: (UNIT-VALUE X UNITS) − PRINCIPAL, and the results are written into the earnings cells in the matrix. The matrix is complete and control returns to calling program PMPMX00.

At block 116, module PMPMXWMO is called to generate the extract records. The internal matrix table built at block 106 contains the composition strings which define the user's requested output. Each composition string corresponds to a field in an extract record where the result will be stored. Module PMPMXSTR is called for each non-blank composition string. For each 5-character component of the composition string, one or more matrix values are read and accumulated until the entire composition string has been processed to produce a single number. All of the composition strings are processed and the resulting records are written to the extract file. Control branches to block 110 and another participant is processed until the whole participant base file has been read and processed.

The matrix accumulation process can also be used by on-line processes to provide account balances for a participant for any or all fund types, funds, transaction class, money class or time class as of a specific date. This process thereby provides a view of the data along specified dimensions without the necessity of storing the data in any particular form (e.g., as a fully normalized relational database) By storing data as transactions and their effects, and using this technique to accumulate the effects, time-variant transactions, retroactive transactions, and reversals are easily processed without manual calculations or a proliferation of updates.

FINANCIAL CONTROL PROCESS

The transaction segments, the creation and maintenance of which has been described above, are used in the preferred embodiment as part of a financial control system. Referring to FIG. 6, a flow chart 130 illustrates the financial control process. (Only those aspects of the Financial Control System which relate to the Investment Plan Management (IPM) system are shown and described. It will be understood that a larger number and variety of transactions and general ledger accounts may also be part of the Financial Control System).

At block 132, program PMPGL100 (modules PMPGL1O, PMPGL102) extracts selected C9 transaction segments from the data base. The selection is based on a date range defined by a beginning date and an ending date which are specified as parms to these batch programs. If either the valuation amount date or the valuation unit date is within the specified date range, then the segment is selected and written to an output file. Thus, if either side of a transaction (units or dollars) has become fixed during this period, the segment is selected.

At block 134, the financial control explosion process (modules PMPGL15, PMPGL152) "explodes" the selected transaction segments into several debit and credit records for different financial control accounts, based on the fund type/fund and an internal chart of accounts. The valuation unit date and the valuation amount date are tested to determine which side(s) of the transaction (units, dollars or both) became fixed during the specified date range. If one side of the transaction has become fixed and the other side is still pended, then a credit record is generated to credit the side that has become fixed to a fund-specific holding account. A corresponding (offsetting) debit record is generated to debit the fixed amount from a general cash or unit account.

If one side of the transaction has become fixed in the date range and the other side was previously fixed (before the date range), then a debit record is generated to debit the side that was previously fixed from the holding account, and a credit record is generated to credit this side of the transaction to an investment fund account. Debit and credit records are also generated to debit the just-fixed side from the general cash (or unit) account and credit it to a fund account. In this embodiment, when dollar amounts are credited to the investment fund accounts, principal and earnings are separate accounts For audit purposes, additional offsetting debit and credit records are generated to move the just-fixed side into and out of a holding account.

In this manner, money (or units) "moves" from a general cash (or units) account to a holding account when only one side is fixed, and from the holding account to the actual investment fund accounts when both the other side is fixed (typically after the batch valuation process values the pended side of the transaction) Of course, for some transaction classes (e.g., withdrawals), the actual movement is in the opposite direction.

If both sides of the transaction became fixed during the date range, all of the debit and credit records are created to move the dollars and units out of general funds, in and out of fund-specific holding accounts, and into the actual investment fund accounts.

At Block 136, the posting process (programs TSPGLFRS and TSPGL20) posts the debits and credits to the financial control fund balance file. The fund balance file may be any file structure suitable for storing data representing balances (accumulated for all participants) in a plurality of accounts. In the fund balance file of this embodiment, separate accounts are maintained for different transaction classes (contributions, withdrawals, transfers, and forfeitures) for the various investment funds and their holding accounts.

At Block 138, the financial control accounts are balanced against data accumulated from the transaction segments. This process uses the matrix accumulation process to calculate balances for all fund type/fund combinations. Then each accumulated fund balance is balanced against the appropriate fund balance file account. The flexibility of the matrix accumulation process allows for separate accumulation of units, earnings, and principal for each transaction class for each fund. Each of these may then be balanced against the corresponding fund balance file account. Balances accumulated from pended transaction segments are balanced against the holding accounts described above; balances accumulated from fixed transaction segments are balanced against the regular (fixed) fund accounts in the financial control accounts.

Referring to FIG. 7, a flow chart 140 illustrates the balancing process (138, FIG. 6) in detail. At block 142, the matrix accumulation program PMPMX00 is run to create an extract file for a particular plan. This results in a file of separate accumulations for each participant. The parameters used to run this program, including the Matrix result pattern, are used to run the other programs referred to below.

At block 144, the extract file from block 132 is input to program PMPGL800 (module PMPGL80) which accumulates total principal, earnings, and units for all participants, for each fund type/fund, and generates an output file with this data. A separate record is generated for each fund type/fund.

At block 146, Program PMPGL810 (module PMPGL81) reads the financial control fund balance file to accumulate total principal, earnings, and units for each fund type/fund and create an extract file. If desired, the results may also be broken down by transaction class.

At block 148, program PMPGL820 (module PMPGL82) balances the financial control fund balance extract file to the matrix accumulation extract file to ensure the total earnings, principal and units are equal between the two files. This program generates an in-balance report and a file of out-of-balance records. At block 140, program PMPGL830 generates an out-of balance report.

In summary, the preferred embodiment of the present invention provides an improved system for managing data for investment plans with multiple investment funds where any of the funds, values, or unit prices may be undetermined for variable periods of time and where the plan rules may vary from plan to plan and over time. It has been shown how the system allows for the presence of time-variant values in the data base while maintaining complete accounting controls. Modifications to this embodiment will be apparent to those of ordinary skill in the art and informed by the present disclosure. It will be understood that the invention is not limited to the preferred embodiment, but is instead defined by the following claims.

We claim:

1. A method of processing data on a general purpose digital computer for a plurality of investment funds and a plurality of participants, each of the investment funds having a time-variant unit value, the method comprising the following steps:
    (a) recording a transaction by storing externally-supplied information, including information identifying one of the participants, information identifying at least one of the investment funds, a transaction effective date, a transaction type, and a first amount value;
    (b) updating a fund balance file having a plurality of accounts by crediting said first amount value to a holding account for the identified investment fund;
    (c) storing an externally-supplied conversion factor for the identified investment fund;
    (d) calculating a second amount value for the recorded transaction using said first amount value and said conversion factor;
    (e) storing said second amount value with the recorded transaction;
    (f) updating the fund balance file by crediting said second amount value to a first fund account for the identified fund and by transferring the first amount value from the holding account to a second fund account for the identified fund;
    (g) repeating steps (a) through (f) to process a plurality of transactions for a plurality of participants affecting a plurality of funds;
    (h) generating participant fund balances for each of said participants and for each of said investment funds by accumulating the first and second amount values from the recorded translations;
    (i) generating cumulative fund balances for each of said investment funds by accumulating said generated participant fund balances over all participants; and
    (j) periodically comparing the generated cumulative fund balances to the fund balance file accounts.

2. The method of claim 1 wherein:
said storing step (c) comprises storing an externally-supplied unit value indicating a ratio of the first amount value to the second amount value for the identified investment fund.

3. The method of claim 1 wherein:
said storing step (c) further comprises the step of storing a reliability date range indicating when the stored conversion factor is reliable; and
said calculating step (d) further comprises the step of verifying that said transaction effective date is within said reliability date range.

4. The method of claim 1 wherein said storing step (c) comprises storing a plurality of control data segments, each control data segment having a reliability date range, a conversion factor, and a fund identifier; and said calculating step (d) comprises matching said transaction effective date and said identified fund with a particular control data segment.

5. A method of processing an investment fund transaction on a general purpose digital computer, the method comprising the following steps:

(a) defining at least two transaction amount data fields for storing data values representing the transaction, said transaction amount data fields comprising a dollar amount data field and a unit amount data field;
(b) identifying a fund affected by the transaction;
(c) recording the transaction by:
  (i) storing an externally-supplied first amount value in a first one of said transaction amount data fields;
  (ii) storing an externally-supplied transaction effective date for indicating when the transaction is effective;
  (iii) storing a first status flag for indicating that said first transaction amount data field has a fixed value;
  (iv) storing a first valuation date for indicating when said first amount value was stored; and
  (v) storing a second status flag for indicating that said second transaction amount data field has a pended value;
(d) updating a fund balance file having a plurality of accounts by crediting said first amount value to a holding account for the identified fund when said first status flag indicates that said first amount data field has a fixed value and said second status flag indicates that the second amount status field has a pended value and said first valuation date is within an externally-supplied processing date range;
(e) storing an externally-supplied unit value indicating a ratio of dollars to units for the identified fund and storing a reliability date range indicating when said stored unit value is reliable;
(f) calculating a second amount value using said first amount value and said unit value if said transaction effective date is within said reliability date range;
(g) unpending the transaction by:
  (i) storing said second amount value in a second one of said at least two transaction amount data fields;
  (ii) updating the second status flag to indicate that said second transaction amount data field has a fixed value; and
  (iii) storing a second valuation date for indicating when said second amount value was stored;
(h) updating the fund balance file by crediting said second amount value to a first fund account for the identified fund and by transferring said first fixed value from the holding account to a second fund account for the identified fund when the first status flag indicates that said first transaction amount data field has a fixed value and the second status flag indicates that the second transaction amount data field has a fixed value and the second valuation date is within an externally-supplied processing date range and the first valuation date is prior to the processing date range;
(i) repeating steps (a) through (h) to process a plurality of transactions for a plurality of participants affecting a plurality of funds;
(j) generating participant fund balances for each of said participants and for each of said funds by accumulating the values stored in said transaction amount data fields;
(k) generating cumulative fund balances for each of said funds by accumulating said generated participant fund balances; and (1) comparing the generated cumulative fund balances to the fund balance file accounts.

6. The method of claim 5 wherein said storing step (e) comprises storing said unit value and said reliability date range on a control data segment.

7. The method of claim 6 wherein said storing step (e) further comprises storing a plurality of control data segments, each control data segment having a reliability date range, a unit value, and a fund identifier; and said calculating step (f) comprises matching said transaction effective date and said identified fund with a particular control data segment.

8. A system for processing data on a general purpose computer for a plurality of investment funds and a plurality of participants, each of the investments funds having a time-variant unit value, the system comprising:
  (a) transaction storage means for storing transaction records containing externally-supplied transaction information, said transaction information identifying one of the participants, at least one investment fund, a transaction effective date, a transaction type, and a transaction amount;
  (b) unit value storage means for storing at least one externally-supplied unit value for each investment fund as of a unit value effective date;
  (c) valuation means coupled to said transaction storage means and to said unit value storage means for periodically updating a selected subset of said transaction records using the investment fund and transaction effective date stored in the transaction record to determine the investment fund unit value as of the transaction effective date; and
  (d) a financial control sub-system comprising:
    (i) master file means for storing data representing fund totals for each of the investment funds;
    (ii) posting means for periodically extracting data form the transaction records and posting debits and credits to said master file means; and
    (iii) balancing means for comparing the fund totals stored in said master file means with fund totals accumulated form the transaction records.

9. The system of claim 8 further comprising matrix accumulation means for calculating and storing fund balances for each of the investment funds for each participant form the transaction records.

10. The system of claim 9 wherein said matrix accumulation means calculates and stores separate fund balances for principal, earnings and units.

11. The system of claim 10 wherein said master file means stores separate fund totals for contributions, withdrawals, transfers, and forfeitures.

12. The system of claim 11 wherein said balancing means includes means for using said matrix accumulation means for calculating participant fund balances from transaction records and means for accumulating participant fund balances for each fund.

13. A method for processing data on a general purpose computer for a plurality of investment funds and a plurality of participants, each of the investments funds having a time-variant unit value, the method comprising:
  (a) storing transaction records containing externally-supplied transaction information, said transaction information identifying one of the participants and including at least one investment fund, a transaction effective date, a transaction type, and a transaction amount;

(b) storing at least one externally-supplied unit value for each investment fund as of a unit value effective date;

(c) periodically updating a selected subset of said transaction records using the investment fund and transaction effective date stored in the transaction record to determine the investment fund unit value as of the transaction effective date;

(d) storing data representing fund totals for each of the investment funds;

(e) periodically extracting data from the transaction records and posting debits and credits to said master file means; and (f) comparing the fund totals stored in said master file means with fund totals accumulated from the transaction records.

* * * * *